United States Patent
Palle Venkata et al.

(10) Patent No.: US 12,069,695 B2
(45) Date of Patent: Aug. 20, 2024

(54) PDCCH HANDLING DURING SCG ACTIVATION

(71) Applicant: Apple Inc., Cupertino, CA (US)

(72) Inventors: Naveen Kumar R Palle Venkata, San Diego, CA (US); Haijing Hu, Los Gatos, CA (US); Fangli Xu, Beijing (CN); Dawei Zhang, Saratoga, CA (US); Yuqin Chen, Shenzhen (CN); Jie Cui, San Jose, CA (US)

(73) Assignee: Apple Inc., Cupertino, CA (US)

( * ) Notice: Subject to any disclaimer, the term of this patent is extended or adjusted under 35 U.S.C. 154(b) by 384 days.

(21) Appl. No.: 17/438,271

(22) PCT Filed: Jul. 29, 2021

(86) PCT No.: PCT/CN2021/109172
§ 371 (c)(1),
(2) Date: Sep. 10, 2021

(87) PCT Pub. No.: WO2023/004669
PCT Pub. Date: Feb. 2, 2023

(65) Prior Publication Data
US 2023/0269749 A1    Aug. 24, 2023

(51) Int. Cl.
*H04W 72/232* (2023.01)
*H04L 5/00* (2006.01)
*H04W 74/0833* (2024.01)

(52) U.S. Cl.
CPC ......... *H04W 72/232* (2023.01); *H04L 5/0053* (2013.01); *H04W 74/0833* (2013.01)

(58) Field of Classification Search
CPC ........... H04W 72/232; H04W 74/0833; H04W 76/27; H04W 74/006; H04L 5/0053
See application file for complete search history.

(56) References Cited

U.S. PATENT DOCUMENTS

2015/0271744 A1 * 9/2015 Liu .................. H04L 5/005
370/329
2020/0260347 A1 8/2020 Xu et al.
(Continued)

FOREIGN PATENT DOCUMENTS

WO    2020197306 A1    10/2020
WO    2020198941 A1    10/2020
(Continued)

OTHER PUBLICATIONS

International Search Report and Written Opinion for PCT/CN2021/109172; 9 pages; Feb. 15, 2022.
(Continued)

*Primary Examiner* — Chae S Lee
(74) *Attorney, Agent, or Firm* — Kowert, Hood, Munyon, Rankin & Goetzel, P.C.

(57) ABSTRACT

This disclosure relates to techniques for physical downlink control channel handling when a secondary cell group is activated in a wireless communication system. A wireless device may establish a wireless link with a master cell group. A secondary cell group may be configured. The wireless device may receive an indication to activate the secondary cell group without performing a random access channel procedure on the secondary cell group. The wireless device may determine quasi-co-located information for a physical downlink control channel of the secondary cell group. The wireless device may perform physical downlink control channel decoding for the physical downlink control channel of the secondary cell group using the determined quasi-co-located information.

20 Claims, 11 Drawing Sheets

(56) References Cited

U.S. PATENT DOCUMENTS

| | | | |
|---|---|---|---|
| 2022/0225453 A1* | 7/2022 | Kim | H04W 28/06 |
| 2022/0225457 A1* | 7/2022 | Purkayastha | H04W 76/15 |
| 2023/0337020 A1* | 10/2023 | Da Silva | H04W 74/0833 |

FOREIGN PATENT DOCUMENTS

| | | |
|---|---|---|
| WO | 2021087949 A1 | 5/2021 |
| WO | 2021088606 A1 | 5/2021 |

OTHER PUBLICATIONS

Extended European Search Report for EP Patent Application No. 21899318.6; 25 pages; Nov. 15, 2022.
"3rd Generation Partnership Project; Technical Specification Group Radio Access Network; NR; Radio Resource Control (RRC) protocol specification (Release 16)", 3GPP Standard; Technical Specification; 3GPP TS 38.331, vol. RAN WG2, No. V16.5.0 6, pp. 1-959; Jun. 2021.
"3rd Generation Partnership Project; Technical Specification Group Radio Access Network; NR; Physical layer procedures for control (Release 16)", 3GPP Standard; Technical Specification; vol. RAN WG1, No. V16.6.0 pp. 1-187, Jun. 2021.
"3rd Generation Partnership Project; Technical Specification Group Radio Access Network; NR; Medium Access Control (MAC) protocol specification (Release 16)", 3GPP Standard; Technical Specification; vol. RAN WG2, No. V16.5.0 7, pp. 1-157, Jun. 2021.
"3rd Generation Partnership Project; Technical Specification Group Radio Access Network; Evolved Universal Terrestrial Radio Access (E-UTRA) and NR; Multi-connectivity; Stage 2 (Release 16)", 3GPP Standard; Technical Specification; vol. RAN WG2, No. V16.6.0 9, pp. 1-88, Jun. 2021.
ZTE Corporation "Summary of AI 8.2.2.3—Activation of deactivated SCG", 3GPP TSG RAN WG2 Meeting #113bis-3 R2-2104317, 15 pages; Apr. 12, 2021.
ETSI MCC "Report of 3GPP TSG RAN WG2 meeting #114-e, Online", 3GPP TSG RAN WG2 Meeting #115-3 R2-21069xx; 297 pages; May 19, 2021.
ZTE Corporation et al. "Discussion on UE behavior when SCG is deactivated", 3GPP TSG RAN WG2 Meeting #114e R2-2105158, 6 pages; May 19, 2021.
NTT Docomo et al. "Further consideration on SCG activation and deactivation", 3GPP TSG RAN WG2 Meeting #113bis-e R2-2104237, 13 pages, Apr. 12, 2021.
Vice Chairman (Nokia) "Report on L Te legacy, Mobility, DCCA, Multi-SIM and RAN slicing", 3GPP TSG RAN WG2 Meeting #114e R2-2106471, 56 pages, May 19, 2021.
Huawei "[AT114-e][230][R17 DCCA] Making progress (Huawei)", 3GPP Draft; R2-2106505, 3GPP TSG RAN WG2 Meeting #114-e R2-2106505, 7 pages, May 19, 2021.
Huawei et al. "Further discussion on SCell activation requirements", 3GPP TSG RAN WG4 Meeting #90bis R4-1903763, Xi'an, China, 4 pages, Apr. 8, 2019.
ZTE Corporation et al. "On Directly Configuring SCell as Activated", 3GPP TSG RAN WG2 Meeting #107bis; R2-1913489, Chongqing, China, 3 pages, Sep. 14, 2019.
Mediatek Inc "CR for SCell activation delay in FR2", 3GPP TSG RAN WG4 Meeting #92bis R4-1911308, Chongqing, China, Oct. 14, 2019.
Apple"On remaining issues for multiple SCell activations", 3GPP TSG RAN4 Meeting #95-e R4-2006192, 5 pages, May 25, 2020.
Mediatek Inc "Discussion on the first SCell activation in FR2", 3GPP TSG RAN4 Meeting #90bis R4-1903586, Xi'an, China, 3 pages, Apr. 8, 2019.

* cited by examiner

PDCCH HANDLING DURING SCG ACTIVATION

PRIORITY CLAIM INFORMATION

This application is a U.S. National Stage application of International Application No. PCT/CN2021/109172, filed Jul. 29, 2021, titled "PDCCH Handling during SCG Activation", which is hereby incorporated by reference in its entirety.

FIELD

The present application relates to wireless communications, and more particularly to systems, apparatuses, and methods for physical downlink control channel handling when a secondary cell group is activated in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for physical downlink control channel handling when a secondary cell group is activated in a wireless communication system.

According to the techniques described herein, a wireless device may be configured to reactivate a secondary cell group without performing a random access channel procedure as part of the reactivation. In order to support the ability of the wireless device to receive downlink communication on the newly reactivated secondary cell group without first performing a random access channel procedure, techniques are provided for the wireless device to determine quasi-co-located information for the secondary cell group implicitly or explicitly by way of configuration information, for example when receiving an indication to reactivate the secondary cell group.

Additionally, techniques are provided for promptly determining when the wireless device is experiencing problems with communication on the reactivated secondary cell group, which may include use of radio link monitoring parameters configured for use for the reactivation of the secondary cell group that may allow for quicker radio link failure detection. Further, techniques are provided for rapidly recovering the link with the secondary cell group when such problems are detected, which may include techniques for performing a random access channel procedure to recover the wireless link with the secondary cell group using a dedicated random access channel resource for the random access channel procedure and/or using an identifier configured for the wireless device for the secondary cell group when performing the random access channel procedure.

Techniques are also provided for configuring the wireless device to provide channel feedback information for the secondary cell group to the master cell group (e.g., in conjunction with secondary cell group reactivation or otherwise), which may facilitate quicker and/or more reliable configuration of various possible communication parameters between the secondary cell group and the wireless device.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
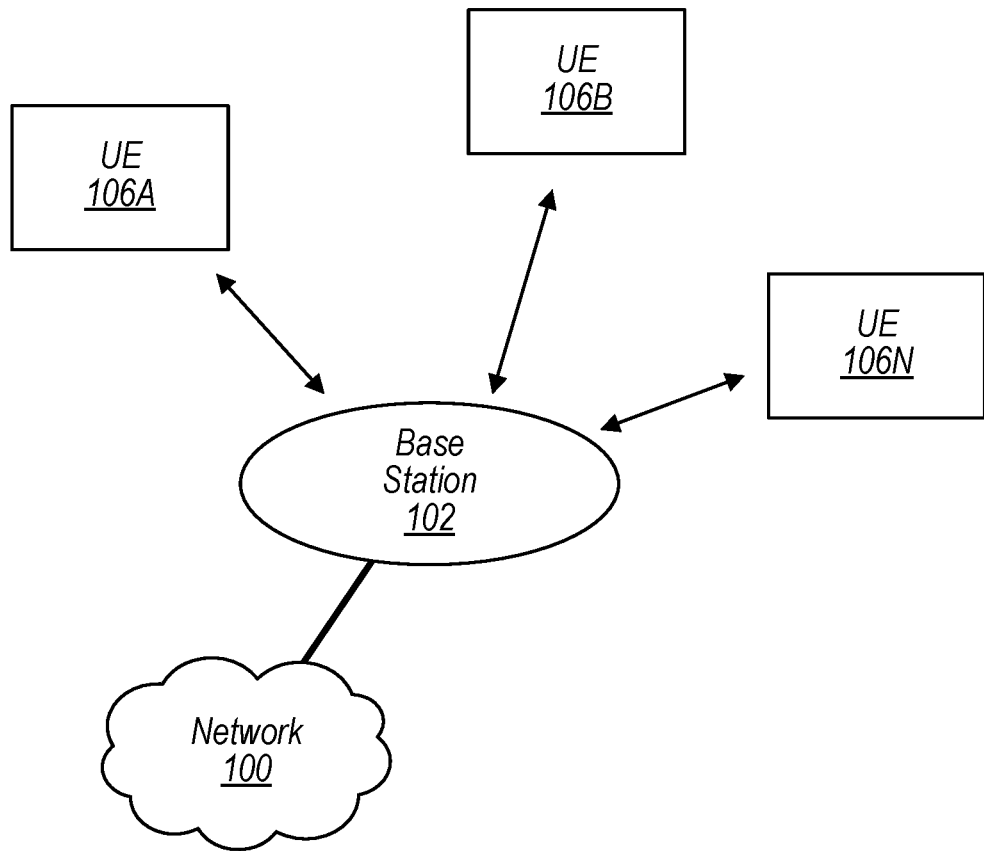
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
BWP: Bandwidth Part
MCG: Master Cell Group
MN: Master Node
SCG: Secondary Cell Group
SN: Secondary Node
PCell: Primary Cell
PSCell: Primary Secondary Cell
SCell: Secondary Cell
RRC: Radio Resource Control
DCI: Downlink Control Information
CORESET: Control Resource Set
QCL: Quasi-Co-Located or Quasi-Co-Location
PDCCH: Physical Downlink Control Channel
DMRS: Demodulation Reference Signals
CSI-RS: Channel State Information Reference Signals
SSB: Synchronization Signal Block Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, Play Station Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
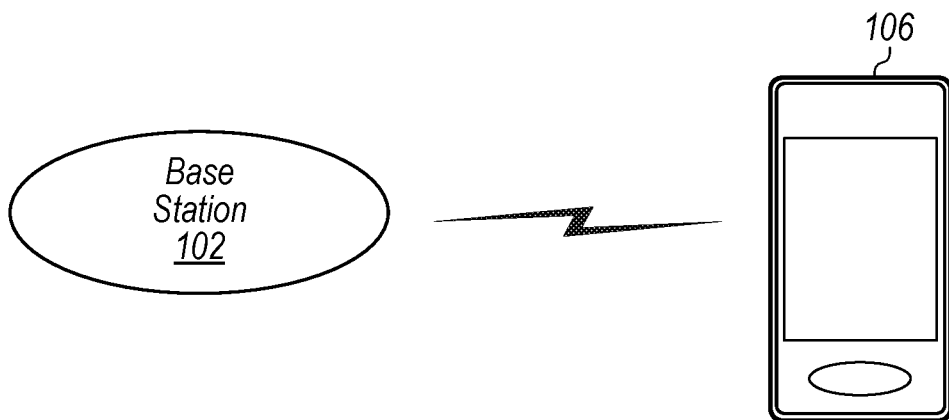
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for physical downlink control channel handling when a secondary cell group is activated in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
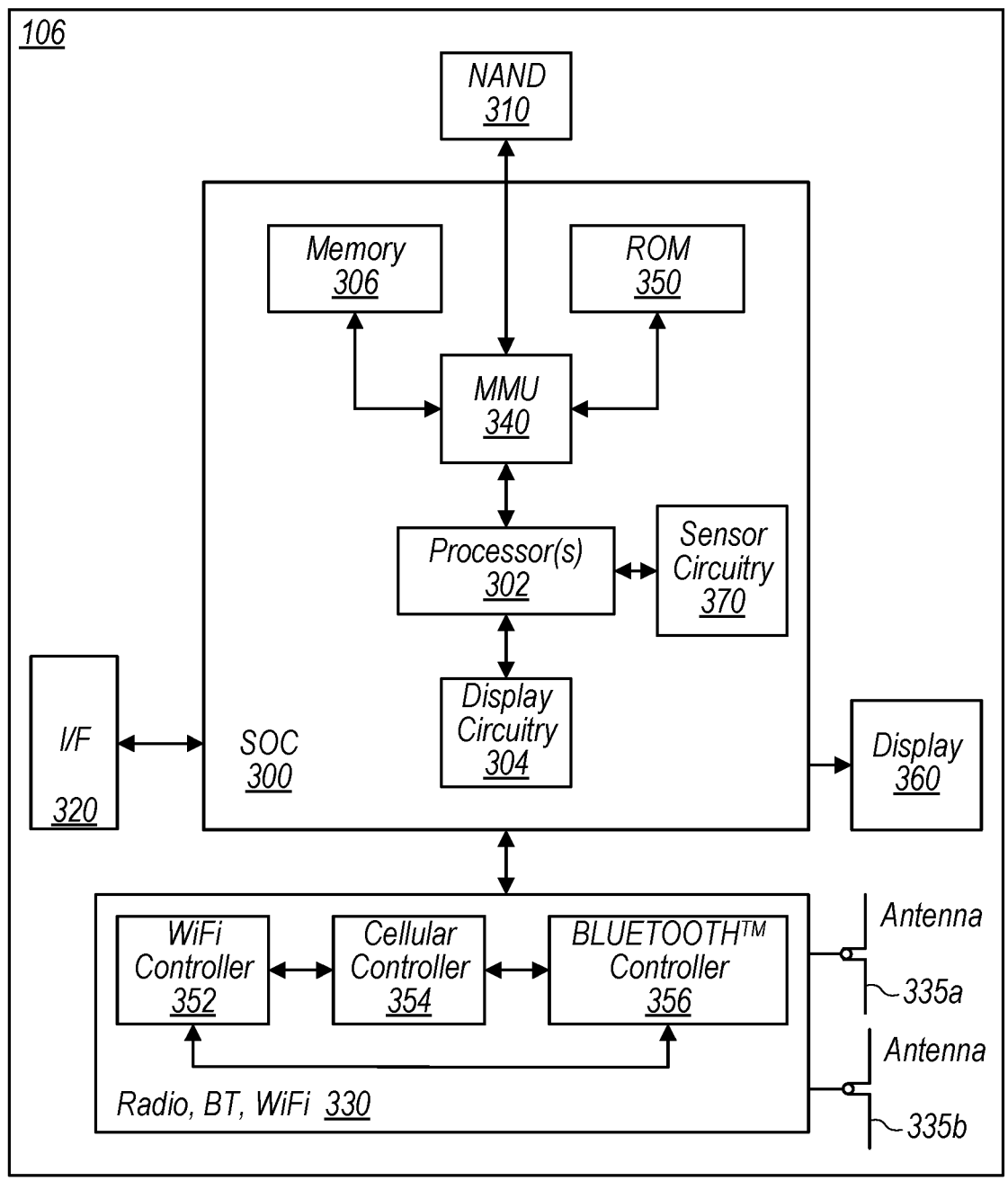
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform techniques for physical downlink control channel handling when a secondary cell group is activated in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for physical downlink control channel handling when a secondary cell group is activated in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
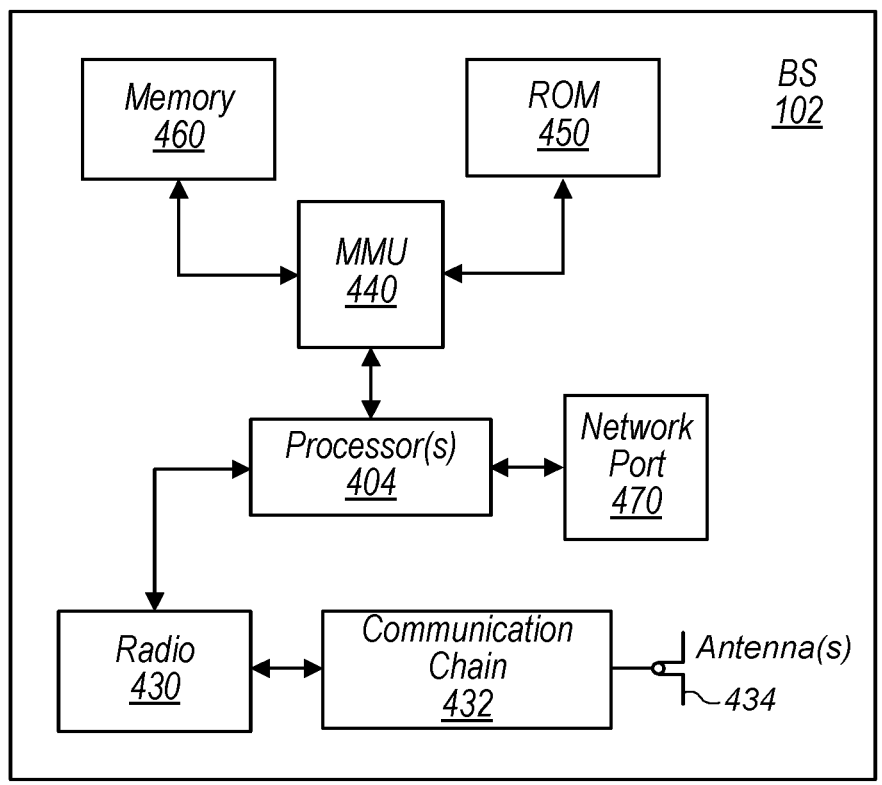
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Reference Signals

A wireless device, such as a user equipment, may be configured to perform a variety of tasks that include the use of reference signals (RS) provided by one or more cellular base stations. For example, initial access and beam measurement by a wireless device may be performed based at least in part on synchronization signal blocks (SSBs) provided by one or more cells provided by one or more cellular base stations within communicative range of the wireless device. Another type of reference signal commonly provided in a cellular communication system may include channel state information (CSI) RS. Various types of CSI-RS may be provided for tracking (e.g., for time and frequency offset tracking), beam management (e.g., with repetition configured, to assist with determining one or more beams to use for uplink and/or downlink communication), and/or channel measurement (e.g., CSI-RS configured in a resource set for measuring the quality of the downlink channel and reporting information related to this quality measurement to the base station), among various possibilities. For example, in the case of CSI-RS for CSI acquisition, the UE may periodically perform channel measurements and send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality.

In many cellular communication systems, the base station may transmit some or all such reference signals (or pilot signals), such as SSB and/or CSI-RS, on a periodic basis. In some instances, aperiodic reference signals (e.g., for aperiodic CSI reporting) may also or alternatively be provided.

As a detailed example, in the 3GPP NR cellular communication standard, the channel state information fed back from the LIE based on CSI-RS for CSI acquisition may include one or more of a channel quality indicator (CQI), a precoding matrix indicator (PMI), a rank indicator (RI), a CSI-RS Resource Indicator (CRI), a SSBRI (SS/PBCH Resource Block Indicator, and a Layer indicator (LI), at least according to some embodiments.

The channel quality information may be provided to the base station for link adaptation, e.g., for providing guidance as to which modulation & coding scheme (MCS) the base station should use when it transmits data. For example, when the downlink channel communication quality between the base station and the UE is determined to be high, the UE may feed back a high CQI value, which may cause the base station to transmit data using a relatively high modulation order and/or a low channel coding rate. As another example, when the downlink channel communication quality between the base station and the UE is determined to be low, the UE may feed back a low CQI value, which may cause the base station to transmit data using a relatively low modulation order and/or a high channel coding rate.

PMI feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through PMI feedback, which MIMO precoding is desired to be applied by the base station. In some cellular systems, the PMI configuration is expressed in matrix form, which provides for linear MIMO precoding. The base station and the UE may share a codebook composed of multiple precoding matrixes, where each MIMO precoding matrix in the codebook may have a unique index. Accordingly, as part of the channel state information fed back by the UE, the PMI may include an index (or possibly multiple indices) corresponding to the most preferred MIMO precoding matrix (or matrixes) in the codebook. This may enable the UE to minimize the amount of feedback information. Thus, the PMI may indicate which precoding matrix from a codebook should be used for transmissions to the UE, at least according to some embodiments.

The rank indicator information (RI feedback) may indicate a number of transmission layers that the UE determines can be supported by the channel, e.g., when the base station and the UE have multiple antennas, which may enable multi-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for Mayer transmission, N number of $N_t \times R$ matrixes may be defined (e.g., where R represents the number of layers, $N_t$ represents the number of transmitter antenna ports, and N represents the size of the codebook). In such a scenario, the number of transmission layers (R) may conform to a rank value of the precoding matrix ($N_t \times R$ matrix), and hence in this context R may be referred to as the "rank indicator (RI)".

Thus, the channel state information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may comprise multiple bits and may indicate the number of signals that the BS may send to the UE in an upcoming time period (e.g., during an upcoming transmission time interval or TTI). For example, an indication of rank 4 may indicate that the BS will send 4 signals to the UE. As one possibility, the RI may be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

Figure 5:
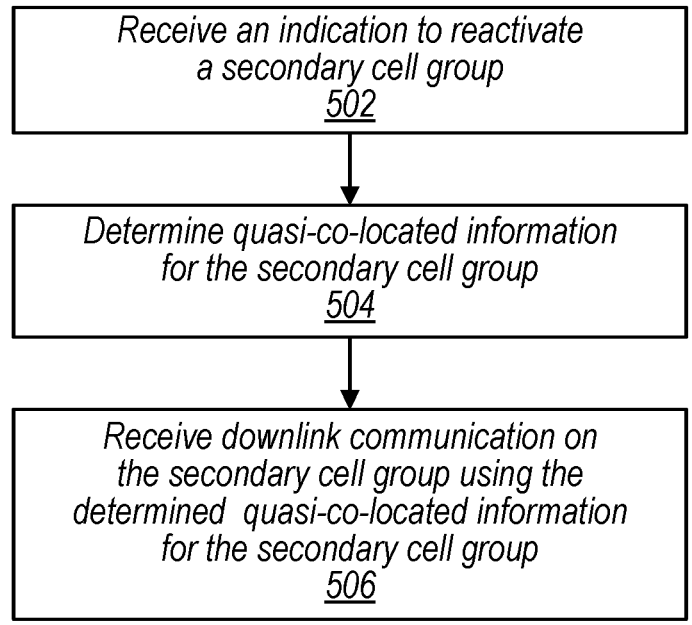
FIG. 5 is a flowchart diagram illustrating aspects of an exemplary possible method for physical downlink control channel handling when a secondary cell group is activated in a wireless communication system, according to some embodiments.

FIG. 5—Physical Downlink Control Channel Handling when a Secondary Cell Group is Activated Cellular communication techniques have developed to include the possibility of carrier aggregation (e.g., in which multiple carriers are provided to a wireless device by a cellular base station, typically as a primary cell and one or more secondary cells), and further to include the possibility of dual connectivity (e.g., in which a wireless device can form a wireless link with multiple base stations and/or base stations that operate according to multiple different RATs, typically as a master cell group and one or more secondary cell groups). As part of development of such techniques, providing a flexible and efficient framework for activating and deactivating secondary cell groups may be an important consideration.

One possible aspect of such a framework may include how to handle initial set up for a secondary cell group that is being activated, for example including how to acquire channel estimation information to facilitate successful reception of initial downlink control communications on the secondary cell group, such as physical downlink control channel reception, at least according to some embodiments.

Accordingly, it may be beneficial to specify techniques for physical downlink control channel handling when a secondary cell group is activated. To illustrate one such set of possible techniques, FIG. 5 is a flowchart diagram illustrating a method for physical downlink control channel handling when a secondary cell group is activated in a wireless communication system, at least according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted.

Additional method elements may also be performed as desired. As shown, the method of FIG. 5 may operate as follows.

The wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a radio resource control (RRC) connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

The cellular base station may provide a master cell group (MCG) for the wireless device. The MCG may also configure a secondary cell group (SCG), which may be provided by a different cellular base station, and which may operate according to the same RAT or a different RAT as the MCG. For example, the MCG could operate according to LTE while the SCG could operate according to NR, or vice versa, or both the MCG and the SCG could operate according to NR, among various possibilities. The SCG may be configured in a deactivated state, or may be configured in an activated state, and may later be deactivated and potentially reactivated, such as in accordance with techniques described subsequently herein.

While the SCG is in the deactivated state, the wireless device may perform radio resource management (RRM) on the SCG, for example including receiving one or more RRM reference signals, and performing one or more measurements on the RRM reference signal(s) to manage the deactivated link with the SCG. At least in some instances, activity on the deactivated SCG may be limited to such RRM activity; in other words, it may be the case that no downlink or uplink control signaling or data transmission is performed on the SCG while the SCG is in the deactivated state. In some instances, the wireless device may be configured to perform monitor and perform measurements on a radio link monitoring (RLM) reference signal and/or a beam failure detection (BFD) reference signal as part of the RRM performed while the SCG is in the deactivated state.

In 502, the wireless device may receive an indication (e.g., from the cellular base station that provides the MCG, which may also be referred to herein as the master node or MN) to reactivate a SCG without performing a random access channel (RACH) procedure on the SCG. The indication to reactivate the SCG may be provided by way of a RRC message, or possibly via media access control (MAC) control element (CE) or downlink control information (DCI). Performing a RACH procedure on a SCG when reactivating the SCG may provide a mechanism for configuring a variety of communication parameters for communication between the wireless device and the SCG, but may come at a cost of signaling burden and setup delays caused by the RACH procedure. Accordingly, techniques for reactivating a SCG without performing a random access channel (RACH) procedure, such as in accordance with this method of FIG. 5, may offer the potential for more rapid SCG activation and/or a reduced network signaling burden, at least according to some embodiments.

In some embodiments, additional information relating to the reactivation of the SCG may be provided by the MN as part of the message that includes the indication to reactivate the SCG, and/or in one or more other messages. For example, in some instances, an indication of a bandwidth part (BWP) on which to reactivate the SCG may be provided to the wireless device by the MN.

As another possibility, an indication of quasi-co-located (QCL) information for the PDCCH of the SCG may be provided to the wireless device by the MN. The indication of the QCL information for the PDCCH of the SCG may include a list of reference signals of the SCG and an indication of which of the listed reference signals is QCL with the PDCCH of the SCG (e.g., an index value pointing to one of the listed reference signals), as one option. Such information may be provided together (e.g., all in a single RRC message that also indicates to reactivate the SCG, as one possibility) or may be provided separately (e.g., the list of reference signals could be provided via RRC signaling, while an index value pointing to one of the listed reference signals to use as QCL for the PDCCH of the SCG could be provided in a MAC CE that also indicates to reactivate the SCG, as one possibility). As another possibility, an RRC message that includes an indication to reactivate the SCG could also explicitly include the reference signal to use as QCL for the PDCCH of the SCG.

As a still further possibility, in some instances, an indication configuring one or more RLM parameters for use for reactivating the SCG may be provided to the wireless device, e.g., by the MN. Such RLM parameters may include one or more timer and/or parameter values that impact how or when radio link failure (RLF) is declared, at least according to some embodiments. For example, the RLM parameters could include a number of consecutive out-of-sync instances configured to trigger initiation of a RLF timer (e.g., a 3GPP N310 parameter), a number of consecutive in-sync instances configured to stop such a RLF timer (e.g., a 3GPP N311 parameter), a length of such a RLF timer (e.g., a 3GPP T310 parameter), and/or any of various other possible parameters. Such parameters may overwrite any previously configured parameters and may be used until further reconfigured, as one possibility. As another possibility, such parameters may be used temporarily (e.g., during SCG reactivation) and the wireless device may be configured to revert to use of previously configured RLM parameter values upon certain configured or specified conditions.

Such "exit conditions" for using the RLM parameters configured for use for reactivating the SCG may be also be configured by the MN (e.g., when providing the indication to reactivate the SCG, or at another time/in another message), or may be pre-agreed. Such exit conditions could include passage of a configured an amount of time and/or number of communication slots, occurrence of one or more events, and/or any of various other possible exit conditions.

As a yet further possibility, in some instances, the wireless device may receive an indication of a dedicated SCG RACH resource for use by the wireless device from the MN, e.g., with the indication to reactivate the SCG. Such information may be provided in case of difficulty with PDCCH decoding on the SCG (e.g., in case PDCCH decoding for the SCG is unsuccessful to the point of triggering RLF on the SCG, which could be determined based at least in part on the RLM parameters configured specifically for the SCG reactivation), even though the SCG reactivation may be configured to be performed without performing a RACH procedure, at least according to some embodiments. For example, it may be useful to provide a mechanism for quickly detecting and recovering from potential PDCCH decoding problems at SCG activation, even though such a mechanism may not be used during SCG reactivation in normal conditions. If desired, the RACH resource could include a beam failure recovery RACH resource.

In 504, the wireless device may determine quasi-co-located (QCL) information for the secondary cell group. The QCL information for the SCG may be determined in any of multiple possible ways. As one possibility, as previously noted, the MN may provide an indication of QCL information for the SCG, such as an indication of a reference signal that is QCL with the PDCCH of a primary secondary cell (PSCell) of the SCG. As another possibility, the wireless device may implicitly determine the QCL information for the SCG. For example, in some embodiments, the MN may not provide an indication of QCL information for the SCG, in which case that wireless device may use a configured or specified approach to implicitly determining the QCL information for the SCG. In such a case, it may be possible that a RRM reference signal provided by/for the SCG and monitored by the wireless device while the SCG is deactivated may be implicitly determined as being QCL with the PDCCH of the PSCell of the SCG. In some instances, the wireless device may determine the QCL information for the SCG based at least in part on the BWP on which the SCG is reactivated. For example, different QCL information may be (implicitly or explicitly) associated with different BWP configurations for the SCG, if desired. Note that the reference signal that is determined to be QCL with the PDCCH of the SCG may include any of various types of reference signals, such as a SSB RS or a CSI-RS, according to various embodiments. Additionally, the reference signal that is determined to be QCL with the PDCCH of the SCG could include a RS configured for any of various purposes, such as a RLM RS, a BFD RS, etc.

In 506, the wireless device may receive downlink communication on the SCG using the determined QCL information for the SCG. The downlink communication received on the SCG may include the PDCCH of the PSCell of the SCG, which may be decoded using PDCCH demodulation reference signals (DMRS). For example, the PDCCH DMRS may be used to form a channel estimation in conjunction with the QCL information for the PDCCH, which may in turn be used to demodulate and decode the PDCCH. At least in some instances, the QCL information may also be used to determine beam characteristics (e.g., a pre-coding matrix) used to receive the PDCCH DMRS and PDCCH.

Note that the RLM parameters configured for use during SCG activation (e.g., if provided) may be used in conjunction with the downlink communication reception on the SCG. In particular, the configured RLM parameters may be used to determine if/when RLF occurs. For example, if the wireless device is unable to successfully receive and decode the PDCCH of the SCG, the wireless device may determine that RLF has occurred in accordance with the configured RLM parameters, and may perform a RACH procedure with the SCG, e.g., to attempt to recover the radio link with the SCG. The RACH procedure may include a contention-free RACH procedure, for example using a dedicated RACH resource configured for the wireless device during SCG reactivation, such as described previously herein. Alternatively, the RACH procedure may include a contention-based RACH procedure. In either case, the wireless device may perform the RACH procedure using wireless device identity information configured for the wireless device by the MN for the SCG, such as a network-configured cell radio network temporary identifier (C-RNTI) for use by the wireless device with the SCG, at least according to some embodiments.

If RLM parameters configured for use during SCG activation were provided and were configured as temporary, and the exit conditions for those RLM parameters are met (e.g., if the downlink communication reception on the SCG is successful and a configured amount of time has passed, as one possibility), the wireless device may discard those temporary RLM parameters and resume use of a previously configured or a default set of RLM parameters, at least according to some embodiments. Note that if RLM parameters configured for use during SCG activation were provided and were not configured as temporary, the wireless device may continue using those RLM parameters during RLM, e.g., until otherwise configured.

In some embodiments, it may be possible that the MN can configure the wireless device to provide channel feedback for the SCG to the MN, for example using a physical uplink shared channel (PUSCH) of a primary cell (PCell) (or another cell) of the MCG. For example, the MN may provide an indication to the wireless device to provide channel feedback for the SCG via the MCG. In such a scenario, the wireless device may perform any channel measurements for the SCG needed to provide the requested channel feedback, and may provide the resulting channel feedback for the SCG to the MCG, e.g., via the PUSCH of the MCG. Such information may be provided to the secondary node (SN) that provides the SCG, and may be used for beam configuration (e.g., transmission configuration indicator selection), uplink spatial relation determination, and/or other communication characteristics for the SCG and the wireless device.

Thus, at least according to some embodiments, the method of FIG. 5 may be used to provide a framework according to which a wireless device can handle PDCCH reception during SCG activation without performing a RACH procedure as part of the SCG activation. Such techniques may reduce the SCG activation time with reduced network signaling overhead in comparison to RACH based SCG activation techniques, among other possible benefits, at least in some instances.

FIGS. 6-14 and Additional Information

FIGS. 6-14 illustrate further aspects that might be used in conjunction with the method of FIG. 5 if desired. It should be noted, however, that the exemplary details illustrated in and described with respect to FIGS. 6-14 are not intended to be limiting to the disclosure as a whole: numerous variations and alternatives to the details provided herein below are possible and should be considered within the scope of the disclosure.

In many cellular communication systems, a physical downlink control channel (PDCCH) is used to provide control information from a cellular base station to UEs served by the cellular base station. UEs may be able to decode the PDCCH using search-space and control resource set (CORESET) configurations as may be provided in bandwidth part (BWP) configuration information. The PDCCH may contain demodulation reference signal (DMRS) resources, which may be used by the UE to estimate channel conditions (fading, phase rotation, etc.) based on the known sequence in the DMRS. The UE may then apply the derived channel estimates on the PDCCH physical resource blocks (PRBs) to derive the channel (de)modulated symbols that can then be used to test hypotheses on the downlink control information (DCI) that the PDCCH carries.

To effectively perform channel estimation using the DMRS, it may be the case that the UE also needs the timing/frequency, channel fading, and long-term channel characteristics of the DMRS, and in case of beamformed PDCCH, the pre-coding matrix characteristics of the DMRS (e.g., the beamformed parameters of the DMRS). Such information may be provided by quasi-co-location (QCL) information. For example, another reference signal with excellent time and frequency auto correlation properties (e.g., synchronization signals) may be provided and may be configured to be QCL with the DMRS. This may allow the UE to obtain the timing/frequency, channel fading, long-term channel characteristics, and/or pre-coding matrix characteristics of the DMRS. The UE may thus be able to apply these derived estimates to the DMRS, e.g., as the UE may be able to assume that the DMRS is also transmitted using the same antenna ports as the reference channel, such that the channel properties (e.g., including fading) are the same between the reference signal and the DMRS.

At least in some instances, the QCL for the PDCCH DMRS may be provided by the synchronization signal blocks (SSB) of the serving cell (e.g., the primary synchronization signal (PSS)/secondary synchronization signal (SSS) may provide the necessary synchronization information for reference, as well as the beam pre-coding information). As another possibility, in some instances the QCL can be a dedicated channel state information reference signal (CSI-RS) that is configured to the UE, in which case, the UE may be provided the QCL information in the CORESET configuration.

Figure 6:
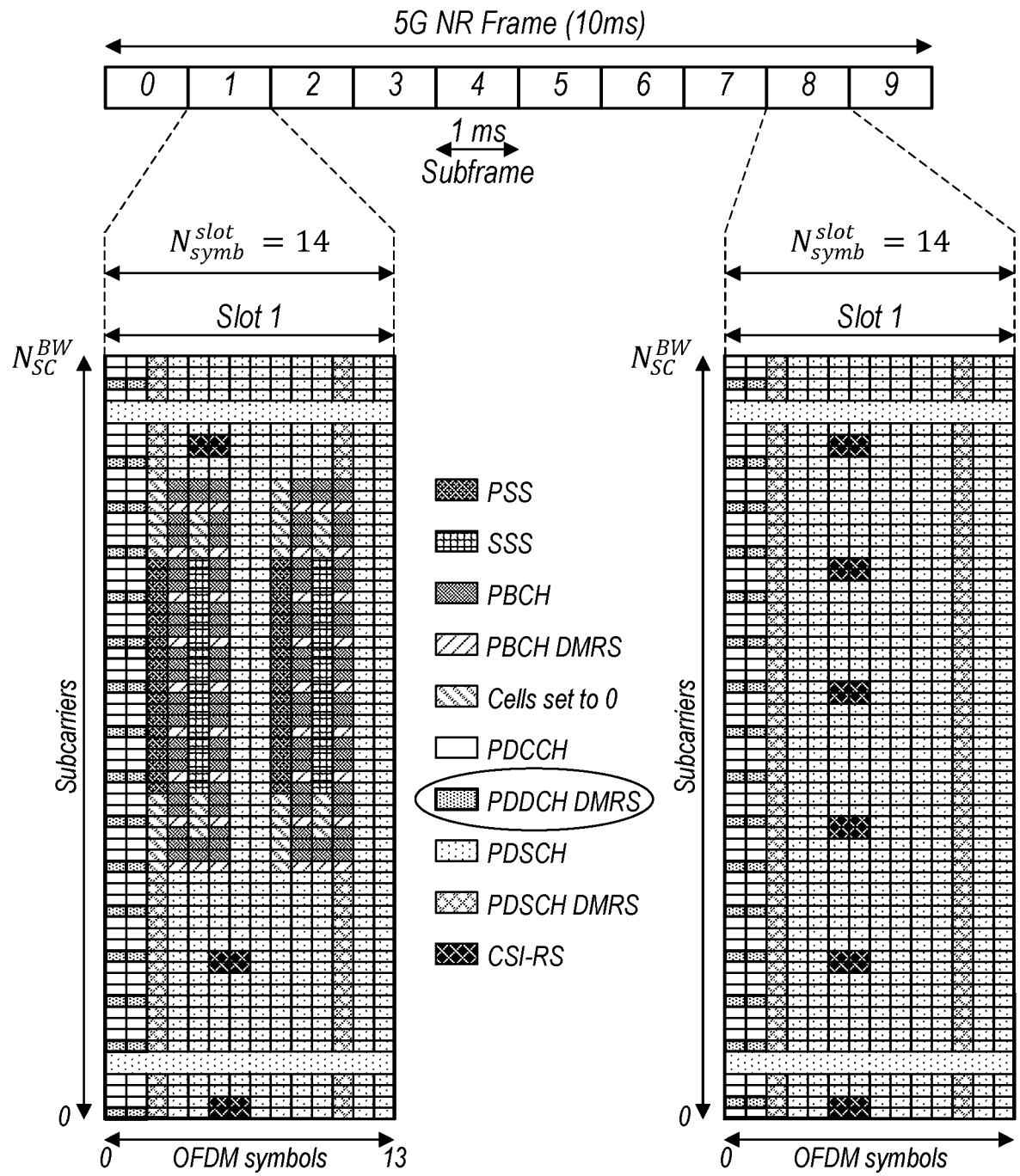
FIG. 6 illustrates exemplary aspects of a possible 5G NR frame, according to some embodiments.

FIG. 6 illustrates exemplary aspects of one possible 5G NR frame that may include such signals, according to some embodiments. As shown, in the illustrated example, the 5G NR frame may include 10 1 ms subframes. Each subframe (or slot) may include 14 orthogonal frequency division multiplexing (OFDM) symbols, and a number of subcarriers that may depend on the total cell bandwidth and the configured subcarrier spacing for the cell. The signals included in the illustrated example slots (i.e., slots 1 and 8) may at least include the PDCCH and the PDCCH DMRS (which may be distributed in an interleaved manner over the PDCCH resources in the frequency domain). Each slot may also include time-frequency resources on which the physical downlink shared channel (PDSCH) and the PDSCH DMRS are provided, as well as CSI-RS resources. For certain slots (e.g., for slot 1, in the illustrated scenario), resources may also be provided for additional signals, such as the PSS, the SSS, the physical broadcast channel (PBCH), and the PBCH DMRS. Certain resources may also be set to 0 (e.g., configured as zero power resources).

In some instances, it may be possible to implement dual connectivity for a UE in a cellular communication system. This may include establishing wireless links with multiple cell groups, which could include cell groups that operate according to different RATs. For example, multi-radio dual connectivity (MR-DC) scenarios could include E-UTRA-NR dual connectivity (EN-DC), in which one cell group operates according to LTE while another cell group operates according to NR, or NR-DC, in which both cell groups operate according to NR, among various possibilities. For such dual connectivity scenarios, it may be the case that one cell group is considered the master cell group (MCG), while the other cell group is considered a secondary cell group (SCG).

Figure 7:
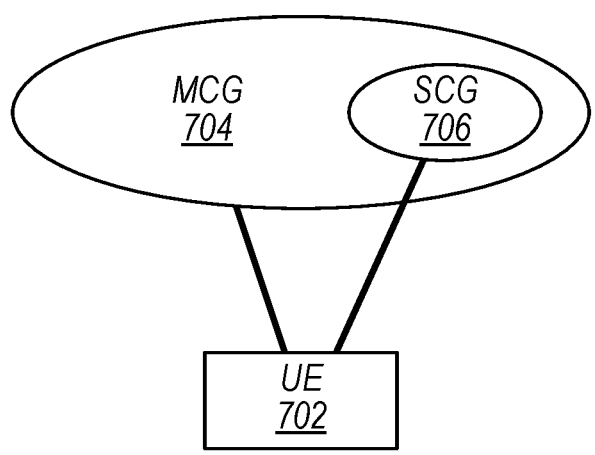
FIG. 7 illustrates exemplary aspects of a possible dual connectivity configuration between a UE and a cellular network, according to some embodiments.

FIG. 7 illustrates exemplary aspects of one such possible dual connectivity configuration between a UE and a cellular network, according to some embodiments. As shown, in the illustrated example, a UE 702 may have links to both a MCG 704 and a SCG 706. While such dual connectivity is active, the UE may maintain control plane connectivity with both the MCG and the SCG. In the MCG, the primary cell (PCell) may always be activated. In the SCG, the primary secondary cell (PSCell) may always be activated. The UE may always support simultaneous reception and transmission in the MCG and the SCG. For the user plane, for split bearer communication, it may be possible that transmission via just the primary leg (e.g., MCG) is used (e.g., for small data amounts), or that transmission via both legs (e.g., both through the MCG and the SCG) is used (e.g., for larger data amounts).

It may be possible, at least in some instances, for a SCG to be configured but not activated. For example, a SCG may be configured for a UE as being initially in a deactivated state, and/or may be activated at one time and later be deactivated. While deactivated, in the control plane, it may be the case that there is no uplink on the PSCell, and that all the secondary cells (Scells) in the SCG are de-activated. There may be no RRC signaling to the UE on the SCG. The UE may still perform radio resource management (RRM), e.g., in accordance with network configuration, and the UE may still be considered in the RRC connected state. In the user plane, the UE may not monitor the PDCCH on the PSCell, and may accordingly not receive any uplink allocations or downlink grants on the SCG while the SCG is deactivated.

Figures 8, 9:
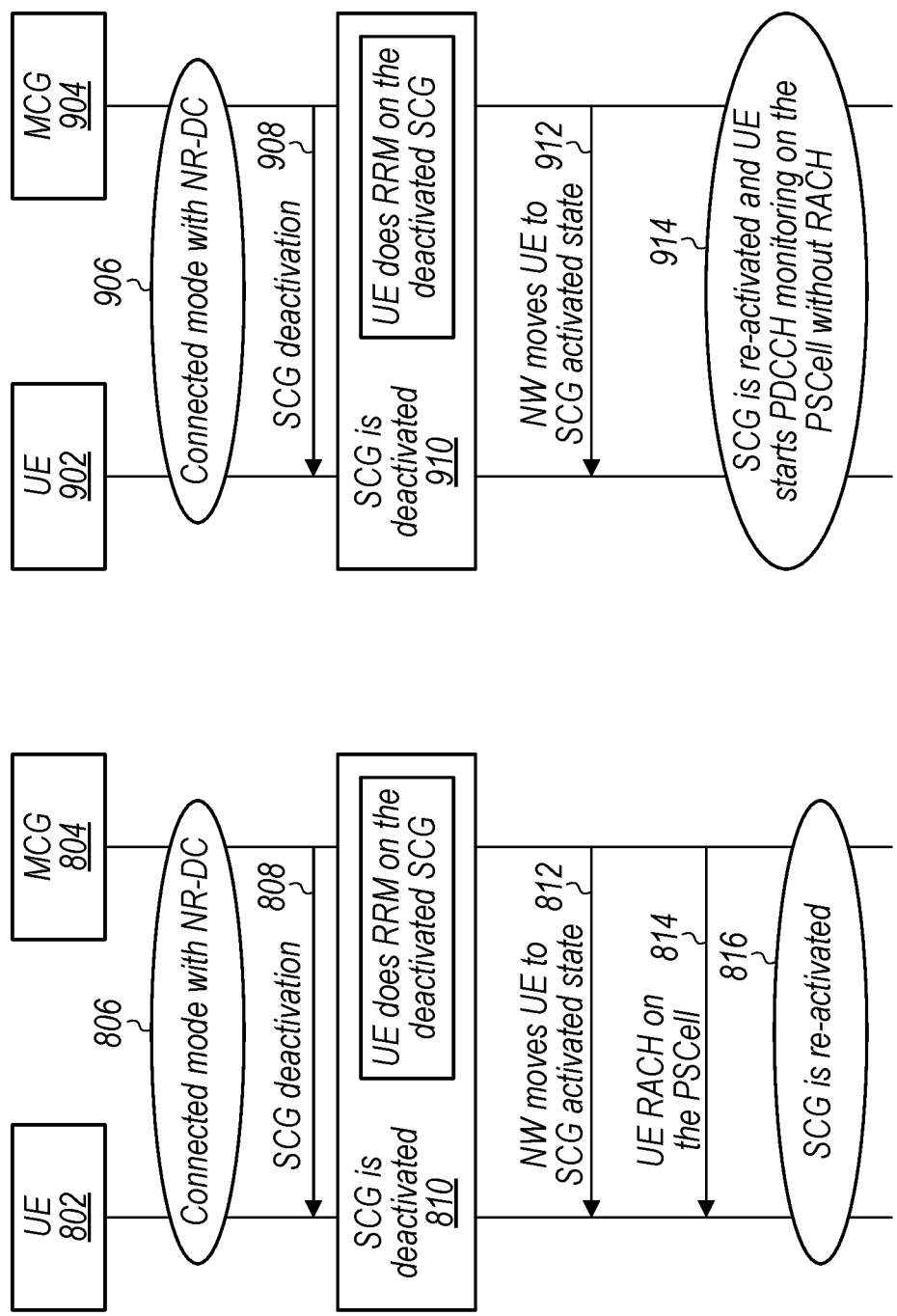
FIGS. 8-9 illustrate exemplary aspects of possible techniques for deactivation and subsequent reactivation of a SCG in a MR-DC cellular communication system, according to some embodiments.

A SCG may be deactivated and activated by way of RRC messages provided via the MCG, at least according to some embodiments. FIGS. 8-9 illustrate exemplary aspects of possible techniques for such deactivation and subsequent reactivation, according to some embodiments. In particular, FIG. 8 illustrates aspects of a scenario in which reactivation of the SCG includes use of a random access channel (RACH) procedure, while FIG. 9 illustrates aspects of a scenario in which reactivation of the SCG does not include use of a RACH procedure.

As shown, in FIG. 8, in 806, a UE 802 and a MCG 804 may establish a RRC connection with NR-DC, e.g., such that a SCG is also activated. In 808, the MCG 804 may indicate to the UE 802 to deactivate the SCG. In 810, the SCG may be deactivated; while deactivated, the UE 802 may continue to perform RRM on the deactivated SCG. In 812, the network may move the UE 802 to a SCG activated state. The indication to move the UE 802 to the SCG activated state may indicate to perform a RACH procedure with the SCG, or it may be implicitly configured that the UE

802 should perform a RACH procedure with the SCG upon reactivation of the SCG. In 814, the UE 802 may perform a RACH procedure on the PSCell of the SCG. In 816, the SCG may be re-activated, and the UE 802 may begin monitoring the PDCCH on the PSCell.

In FIG. 9, in 906, a UE 902 and a MCG 904 may establish a RRC connection with NR-DC, e.g., such that a SCG is also activated. In 908, the MCG 904 may indicate to the UE 902 to deactivate the SCG. In 910, the SCG may be deactivated; while deactivated, the UE 902 may continue to perform RRM on the deactivated SCG. In 912, the network may move the UE 902 to a SCG activated state. The indication to move the UE 902 to the SCG activated state may indicate to skip performing a RACH procedure with the SCG, or may simply not indicate to perform a RACH procedure with the SCG. In 914, the SCG may be re-activated, and the UE 902 may begin monitoring the PDCCH on the PSCell.

Figure 10:
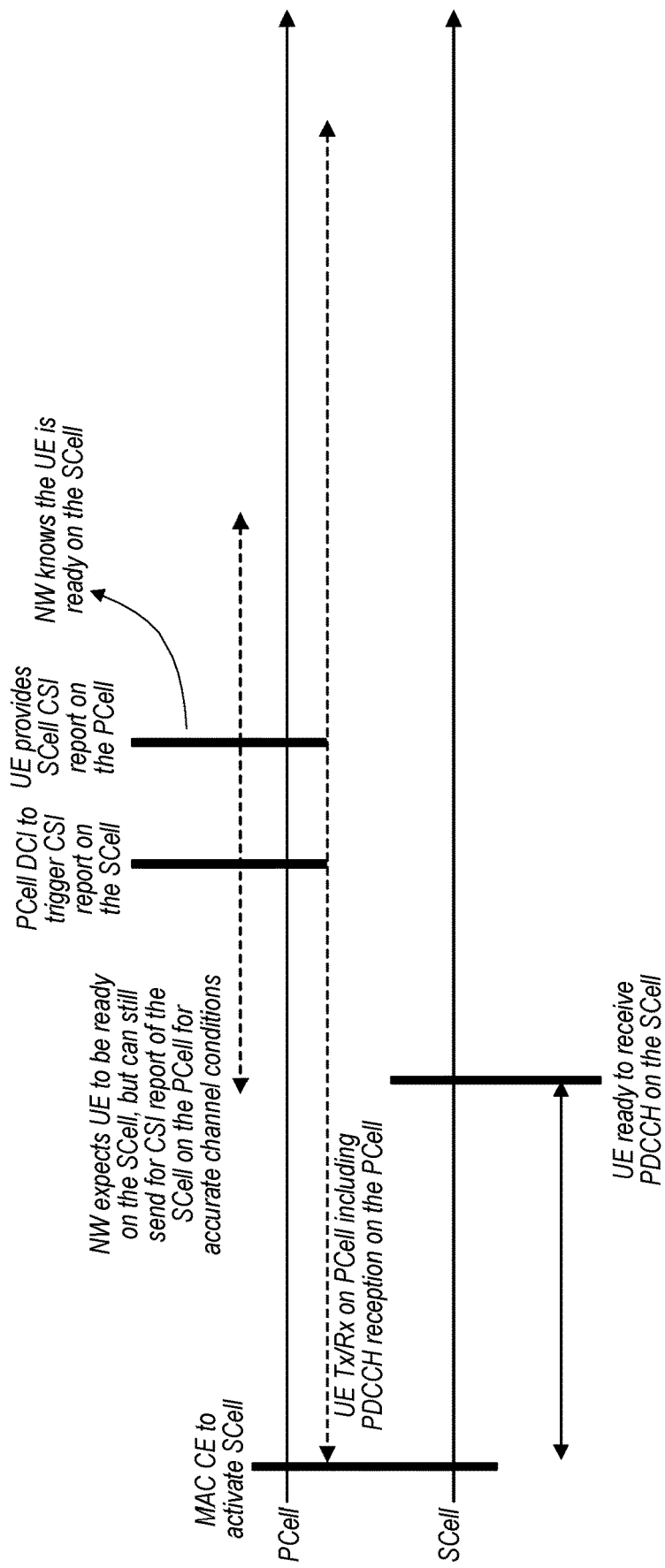
FIG. 10 illustrates exemplary aspects of possible techniques for activation of secondary carriers in accordance with a carrier aggregation framework, according to some embodiments.

FIG. 10 illustrates exemplary aspects of possible techniques for activation of secondary carriers in accordance with a carrier aggregation framework, for example for activating a SCell in addition to a PCell in the same cell group, according to some embodiments. According to the illustrated framework, the SCell may be activated using the PCell, and once the activation is complete, the UE may be expected to start receiving the PDCCH on the SCell to facilitate provision of uplink grants and downlink allocations on the PUSCH and PDSCH respectively. The primary cell can still control the UE uplink feedback of the SCell using DCI on the PCell. Thus, since the PDCCH on the PCell may still be active while the SCell is deactivated, the PCell can provide an anchor role while the SCell is being set up. This may include the UE reporting the SCell channel feedback on the PCell, e.g., based on DCI provided on the PCell PDCCH, which may avoid the possibility that any potential issues with decoding the PDCCH on the SCell could negatively affect the ability of the UE to set up the SCell.

Figure 11:
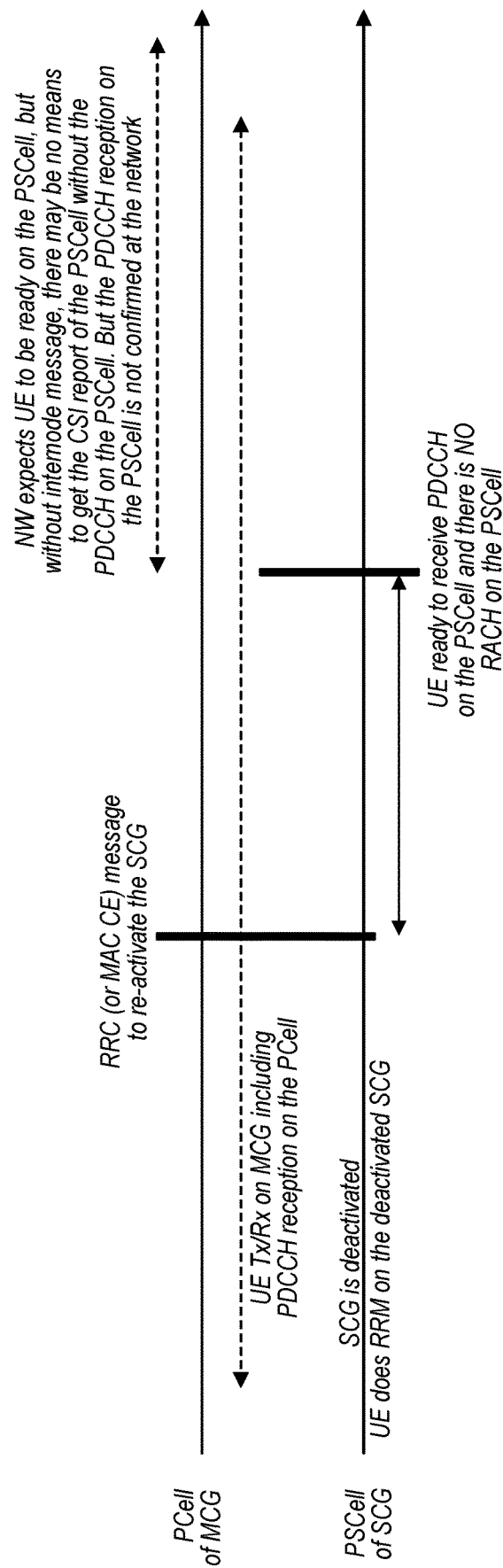
FIG. 11 illustrates exemplary aspects of possible techniques for activation of a PSCell of a SCG without performing a RACH procedure, according to some embodiments.

FIG. 11 illustrates exemplary aspects of possible techniques for activation of a PSCell of a SCG without performing a RACH procedure, according to some embodiments. Such SCG reactivation (e.g., after the SCG was previously deactivated) could use a similar approach between the PCell of the MCG and the PSCell of the SCG as in FIG. 10 between the PCell and the SCell, but the anchoring of the PCell of the MCG for the PSCell of the SCG may require very low latency inter node coordination, for example for the SCG to be able to request that the MCG trigger DCI for the PSCell operation, and for the MCG to relay the channel feedback information (etc.) to the SCG at the slot timing latency, which may not always be realistic, e.g., if the MCG and the SCG are not co-located, and/or for any of various other possible reasons. Additionally, such coordination may require an inter-node interface to transfer the control activation as well as to support the transfer of the feedback information across the MCG/SCG notes, and/or an interface at the MCG/UE in the DCI to interpret the PSCell actions yea the PCell DCI. In case such coordination is not possible and/or to avoid the need for such a degree of coordination, another approach to configuring proper QCL information for the DMRS of the PDCCH (e.g., to support successful decoding of the PSCell PDCCH by the UE), and/or to support the UE informing the network of any issues the UE is having with decoding the PSCell PDCCH successfully in a timely manner, may be useful.

As one such possibility for configuring QCL information for the DMRS of the PDCCH of the PSCell, the reference signal to use for the QCL information may be indicated explicitly or may be determined through an implicit assumption (e.g., that may be specified in one or more 3GPP Technical Specifications or otherwise mutually agreed upon by the network and the UE).

In the implicit case, the RRM reference signal that the UE measures while the SCG is deactivated may be used as the QCL reference signal for the DMRS of the PDCCH at SCG activation, at least as one possibility.

If the network wants the UE to use a different reference signal (e.g., other than RRM RS), the network may provide this reference signal configuration explicitly to the UE, e.g., in the RRC message that reactivates the SCG. The RRC message may contain the explicit reference signal, or the RRC message may contain a list of reference signals and an index to the particular reference signal on the list that the UE should use. As another possibility, if MAC CE or DCI based SCG activation is performed, then the MAC CE or DCI may indicate the index for the reference signal that the UE should use (e.g., where the list or possible reference signals to use may have been provided to the UE previously in a RRC message).

In some instances, it may be possible that a UE is configured to receive radio link monitoring (RLM) and/or beam failure detection (BFD) reference signals and to perform RLM and/or BFD on a SCG, e.g., as part of RRM while the SCG is deactivated, and/or upon SCG reactivation. Thus, in such a scenario, it may also be possible that the RLM or BFD RS can be configured to the UE as the reference signal that is to be used as QCL for the PDCCH DMRS.

When the SCG is re-activated via RRC message, it may be the case that the bandwidth part (BWP) identifier for the BWP on which the PSCell should activate may be indicated. Similarly, if a MAC CE is used for reactivation, this can also point to the BWP to use for the PSCell. In some instances, the reference signal configuration used for the QCL for the PDCCH DMRS may be BWP specific, for example such that depending on the BWP on which the PSCell reactivation occurs, the reference signals corresponding to the indicated BWP may be used for the QCL reference for the PDCCH DMRS.

Figure 12:
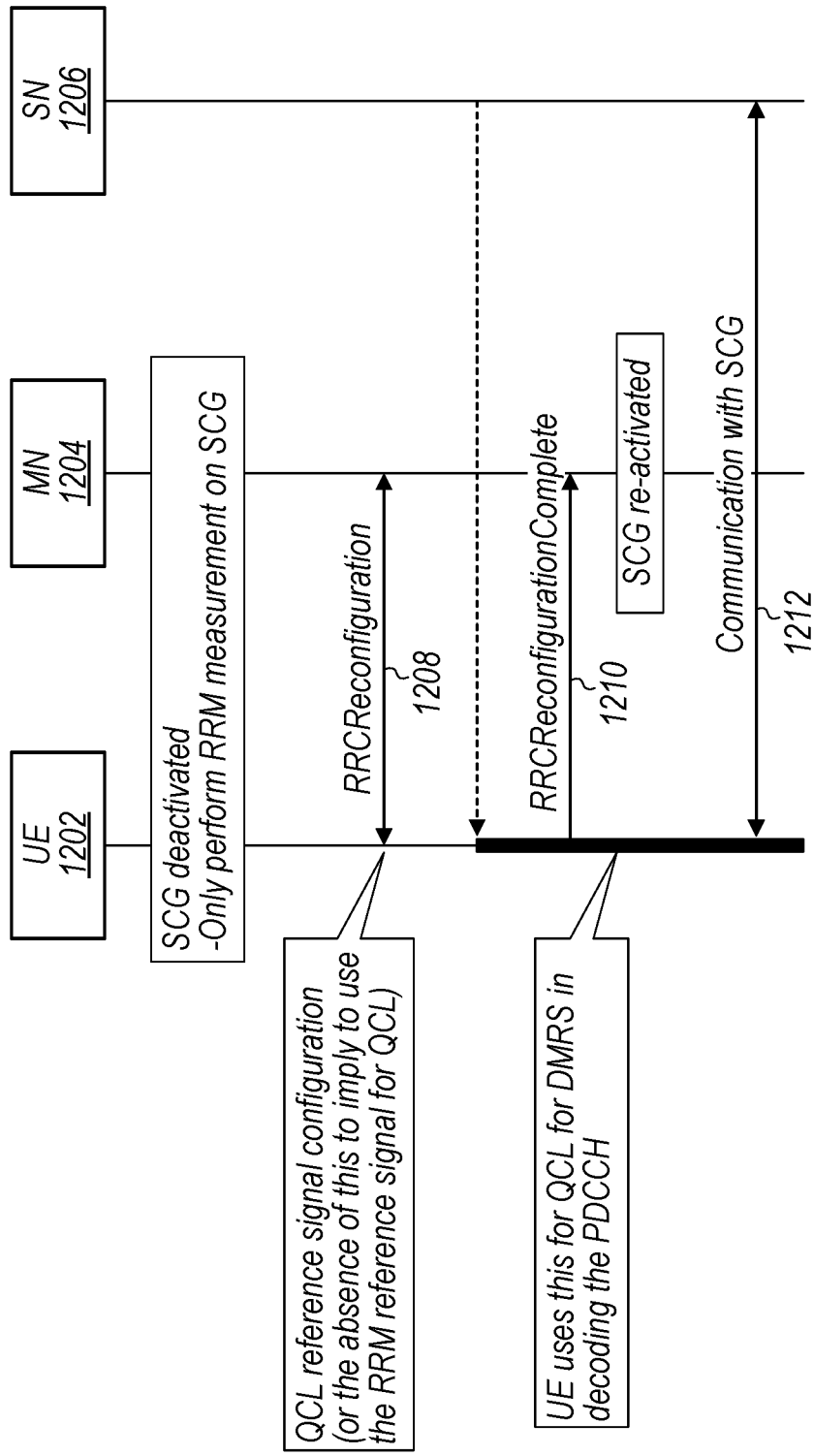
FIG. 12 illustrates exemplary aspects of a possible technique for activation of a PSCell of a SCG including support for determining QCL information for PDCCH DMRS without performing a RACH procedure on the SCG, according to some embodiments.

FIG. 12 illustrates exemplary aspects of a possible technique for activation of a PSCell of a SCG including support for determining QCL information for PDCCH DMRS without performing a RACH procedure on the SCG, according to some embodiments. As shown, a UE 1202 and a master node (MN) 1204 may have configured a deactivated SCG. The UE may perform only RRM measurements on the SCG while the SCG is deactivated. In 1208, the MN 1204 may provide RRC reconfiguration information re-activating the SCG on a secondary node (SN) 1206. The RRC reconfiguration information may configure a QCL reference signal configuration for the PDCCH DMRS for the SCG, or if such information is absent, the UE 1202 may determine that the absence of this information implies to the UE 1202 to use the RRM reference signal as being QCL with the PDCCH DMRS. The UE 1202 may correspondingly use the (explicitly or implicitly) indicated QCL reference signal when performing PDCCH channel estimation using the PDCCH DMRS. In 1210, the UE 1202 may provide a RRC reconfiguration complete indication to the MN 1204, and the SCG may be considered re-activated. In 1212, the UE 1202 and the SN 1206 may perform communication via the SCG.

Figure 13:
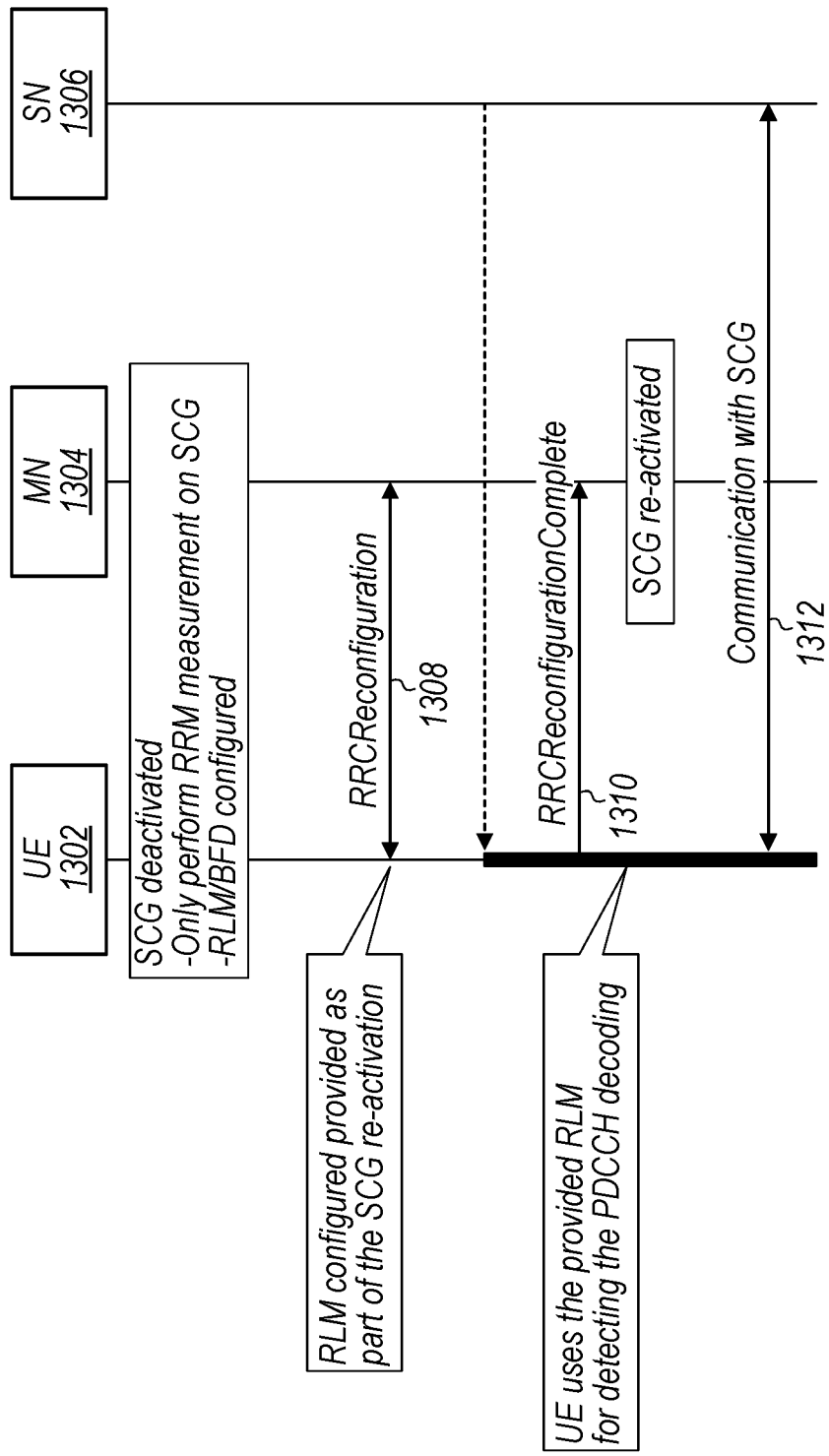
FIG. 13 illustrates exemplary aspects of a possible technique for activation of a PSCell of a SCG without performing a RACH procedure on the SCG, including a mechanism for more quickly recovering from PDCCH failure in case such a scenario occurs, according to some embodiments.

As previously noted herein, it may also be important in at least some instances to provide techniques for fast recovery from PDCCH decoding issues in case of RACH-less SCG activation. As one possibility, such techniques may include mechanisms to speed up RLM and/or BFD, e.g., so that the UE can report any detected problems using a RACH procedure, and correspondingly resolve the detected problems, more quickly. FIG. 13 illustrates exemplary aspects of such a possible technique for activation of a PSCell of a SCG without performing a RACH procedure on the SCG, including a mechanism for more quickly recovering from PDCCH failure in case such a scenario occurs, according to some embodiments.

As shown, in the illustrated scenario, a UE 1302 and a MN 1304 may have configured a deactivated SCG. The UE may perform only RRM measurements on the SCG while the SCG is deactivated. RLM/BFD measurements may be configured as part of the RRM measurements. In 1308, the MN 1304 may provide RRC reconfiguration information re-activating the SCG on a SN 1306. The RRC reconfiguration information provided as part of the SCG re-activation may include RLM configuration information. The UE 1302 may correspondingly use the provided RLM configuration for detecting the PDCCH decoding on the SCG. In 1310, the UE 1302 may provide a RRC reconfiguration complete indication to the MN 1304, and the SCG may be considered re-activated. In 1312, the UE 1302 and the SN 1306 may perform communication via the SCG.

The RLM parameters that are indicated to be used as part of the SCG re-activation could include such parameters as T310, N310, N311 (e.g., as may be defined in 3GPP Technical Specifications), among various possibilities. For example, the parameters may include one or more timer values and/or threshold numbers of in-sync and out-of-sync instances that are used in determining if/when radio link failure (RLF) occurs. The configured RLM parameters may overwrite any previously configured such parameter values, or may be used only temporarily (e.g., for the SCG re-activation time), with a specified or configured exit condition for the case where the UE considers that the temporary parameters are no longer valid, or with the UE implicitly discarding the temporary parameters after a pre-agreed static parameter (such as an amount of time in units of ms, a number of slots, etc.). The RLM parameters configured for the SCG re-activation may be selected to more quickly trigger a failure in case the UE has issues decoding the PDCCH of the SCG (e.g., lower timer value, lower threshold number of out-of-sync instances configured to trigger timer initiation, etc.), at least in some instances.

Figure 14:
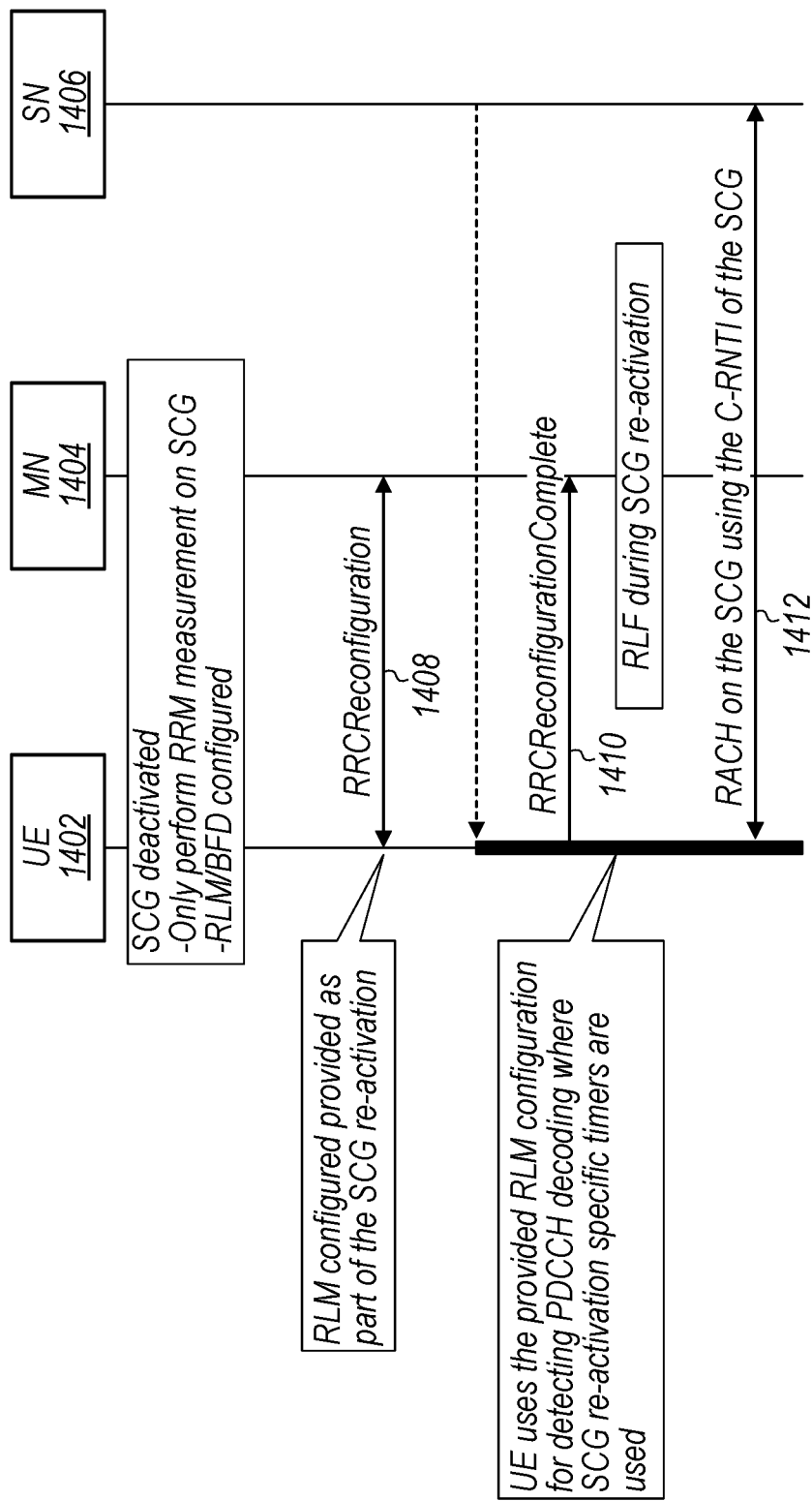
FIG. 14 illustrates exemplary aspects of a possible technique for activation of a PSCell of a SCG without initially performing a RACH procedure on the SCG, including a mechanism for later performing a RACH procedure if needed to facilitate recovery from PDCCH failure, according to some embodiments.

It may also or alternatively be useful, at least according to some embodiments, to provide support for a UE to perform a RACH procedure on the SCG if needed (e.g., in case of difficulty decoding the PDCCH on the PSCell) even if SCG re-activation initially does not include a RACH procedure on the SCG. FIG. 14 illustrates exemplary aspects of such a possible technique for activation of a PSCell of a SCG without initially performing a RACH procedure on the SCG, including a mechanism for later performing a RACH procedure if needed to facilitate recovery from PDCCH failure, according to some embodiments.

As shown, in the illustrated scenario, a UE 1402 and a MN 1404 may have configured a deactivated SCG. The UE may perform only RRM measurements on the SCG while the SCG is deactivated. RLM/BFD measurements may be configured as part of the RRM measurements. In 1408, the MN 1404 may provide RRC reconfiguration information re-activating the SCG on a SN 1406. The RRC reconfiguration information provided as part of the SCG re-activation may include RLM configuration information. The UE 1402 may correspondingly use the provided RLM configuration for detecting the PDCCH decoding on the SCG. SCG re-activation specific timers/parameters may be used for the RLM. In 1410, the UE 1402 may provide a RRC reconfiguration complete indication to the MN 1304, and the SCG may be considered re-activated. However, RLF may occur during the SCG re-activation, e.g., in accordance with the SCG re-activation specific RLM parameters. Accordingly, in 1412, the UE 1402 and the SN 1406 may perform a RACH procedure on the SCG using the C-RNTI of the UE 1402 as configured by the network for the SCG. The RACH procedure may be performed on a dedicated RACH resource provided to the UE 1402 as part of the RRC message that re-activates the SCG, so that the UE 1402 can use a contention-free RACH procedure, in some embodiments. If desired, the RACH resource can be a beam-failure recovery RACH resource provided for the UE 1402. As another possibility, the UE 1402 can perform the RACH procedure using a contention based procedure. The UE 1402 may still use the C-RNTI configured by the network for the SCG in such a scenario.

According to some embodiments, it may be useful to support PUSCH based channel state information (CSI) reporting for the PSCell on the PCell in conjunction with SCG activation. For example, during PSCell activation, the UE may perform a layer 1 (L1) measurement to acquire the beam information on the target PSCell. The L1 measurement of CSI or L1-RSRP could be based on SSB or CSI-RS of the target being-activated PSCell. The L1 measurement could be aperiodic, or semi-persistent, or periodic. The UE may report the L1 measurement results on the PCell PUSCH or another active serving cell's PUSCH. The L1 measurement report could also be aperiodic, or semi-persistent, or periodic. The L1 measurement and report may be triggered by the network. Such measurement and reporting may be useful in order to pass the beam information from the UE to the network for TCI and uplink spatial relation determination for the PSCell of the SCG, at least according to some embodiments.

In the following further exemplary embodiments are provided.

One set of embodiments may include an apparatus, comprising: a processor configured to cause a wireless device to: establish a wireless link with a cellular base station that provides a master cell group (MCG) for the wireless device; receive information configuring a secondary cell group (SCG); receive an indication to activate the SCG without performing a random access channel (RACH) procedure on the SCG; determine quasi-co-located (QCL) information for a physical downlink control channel (PDCCH) of the SCG; and perform PDCCH decoding for the PDCCH of the SCG based at least in part on the determined QCL information for the PDCCH of the SCG.

According to some embodiments, the processor is further configured to cause the wireless device to: perform radio resource management (RRM) while the SCG is in the deactivated state using a RRM reference signal provided by the SCG; and determine that the RRM reference signal is QCL with the PDCCH of the SCG.

According to some embodiments, the processor is further configured to cause the wireless device to: receive an indication of the QCL information for the PDCCH of the SCG from the cellular base station that provides the MCG for the wireless device.

According to some embodiments, the indication of the QCL information for the PDCCH of the SCG is included in a radio resource control message that also includes the indication to activate the SCG without performing a RACH procedure on the SCG.

According to some embodiments, the indication of the QCL information for the PDCCH of the SCG includes a list of reference signals and an index to a reference signal from the list of reference signals that is QCL with the PDCCH of the SCG.

According to some embodiments, a radio link monitoring (RLM) reference signal provided for the SCG is determined to be QCL with the PDCCH of the SCG.

According to some embodiments, a beam failure detection (BFD) reference signal provided for the SCG is determined to be QCL with the PDCCH of the SCG.

Another set of embodiments may include a wireless device, comprising: an antenna; a radio operably coupled to the antenna; and a processor operably coupled to the radio; wherein the wireless device is configured to: establish a wireless link with a cellular base station that provides a master cell group (MCG) for the wireless device; receive information configuring a secondary cell group (SCG) in a deactivated state; receive an indication to reactivate the SCG without performing a random access channel (RACH) procedure on the SCG; determine quasi-co-located (QCL) information for a physical downlink control channel (PDCCH) of the SCG; and perform PDCCH decoding for the PDCCH of the SCG based at least in part on the determined QCL information for the PDCCH of the SCG.

According to some embodiments, the wireless device is further configured to: receive an indication of a bandwidth part (BWP) on which to reactivate the SCG.

According to some embodiments, the QCL information for the PDCCH of the SCG is determined based at least in part on the indication of the BWP on which to reactivate the SCG.

According to some embodiments, the wireless device is further configured to: receive an indication configuring one or more radio link monitoring (RLM) parameters for use for reactivating the SCG.

According to some embodiments, the wireless device is further configured to: receive an indication of one or more exit conditions for using the one or more RLM parameters configured for use for reactivating the SCG.

According to some embodiments, the wireless device is further configured to: determine that PDCCH decoding for the PDCCH of the SCG is unsuccessful; and perform a RACH procedure on the SCG based at least in part on determining that PDCCH decoding for the PDCCH of the SCG is unsuccessful, wherein the RACH procedure on the SCG is performed using a cell radio network temporary identifier (C-RNTI) configured for the SCG.

According to some embodiments, the indication to reactivate the SCG configures a dedicated RACH resource, wherein the RACH procedure is a contention-free RACH procedure performed using the dedicated RACH resource configured by the indication to reactivate the SCG.

According to some embodiments, the wireless device is further configured to: receive an indication from the MCG to provide channel feedback for the SCG to the MCG; perform one or more channel measurements for the SCG; and provide the channel feedback for the SCG to the MCG, wherein the channel feedback is determined based at least in part on the one or more channel measurements for the SCG, wherein the channel feedback for the SCG is provided to the MCG using a physical uplink shared channel (PUSCH) for the MCG.

Yet another set of embodiments may include a cellular base station, comprising: an antenna; a radio operably coupled to the antenna; and a processor operably coupled to the radio; wherein the cellular base station is configured to: establish a wireless link with a wireless device, wherein the cellular base station provides a master cell group (MCG) for the wireless device; provide information to the wireless device configuring a secondary cell group (SCG) in a deactivated state; and provide an indication to the wireless device to reactivate the SCG without performing a random access channel (RACH) procedure on the SCG, wherein the indication to reactivate the SCG includes an indication of quasi-co-located (QCL) information for a physical downlink control channel (PDCCH) of the SCG.

According to some embodiments, the cellular base station is further configured to: provide an indication to the wireless device of a bandwidth part (BWP) on which to reactivate the SCG.

According to some embodiments, the cellular base station is further configured to: provide an indication configuring one or more radio link monitoring (RLM) parameters for use for reactivating the SCG.

According to some embodiments, the cellular base station is further configured to: configure a dedicated RACH resource for the wireless device for the SCG, wherein the dedicated RACH resource is configured for use if PDCCH decoding for the SCG is unsuccessful.

According to some embodiments, the cellular base station is further configured to: provide an indication to the wireless device to provide channel feedback for the SCG; receive the channel feedback for the SCG from the wireless device, wherein the channel feedback for the SCG is received using a physical uplink shared channel (PUSCH); and provide the channel feedback for the SCG received from the wireless device to the SCG.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/ signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A processor configured to:
   establish a wireless link with a cellular base station that provides a master cell group (MCG) for a wireless device;
   establish an additional wireless link with a second cellular base station that provides a secondary cell group (SCG) for the wireless device, wherein the SCG includes a primary secondary cell (PSCell);
   receive an indication to deactivate the SCG;
   receive at least one of a radio link monitoring (RLM) reference signal to perform RLM or a beam failure detection (BFD) reference signal to perform BFD on the SCG while the SCG is deactivated;
   receive an additional indication to activate the SCG without performing a random access channel (RACH) procedure on the SCG;
   determine quasi-co-located (QCL) information for a physical downlink control channel (PDCCH) of the SCG using the at least one of the RLM reference signal or BFD reference signal that was received while the SCG was deactivated; and
   perform PDCCH decoding for the PDCCH of the SCG based at least in part on the determined QCL information for the PDCCH of the SCG.

2. The processor of claim 1, wherein the processor is further configured to:
   receive a supplemental indication of the QCL information for the PDCCH of the SCG from the cellular base station that provides the MCG for the wireless device.

3. The processor of claim 2, wherein the supplemental indication of the QCL information for the PDCCH of the SCG is included in a radio resource control message that also includes the additional indication to activate the SCG without performing a RACH procedure on the SCG.

4. The processor of claim 2, wherein the supplemental indication of the QCL information for the PDCCH of the SCG includes a list of reference signals and an index to a reference signal from the list of reference signals that is QCL with the PDCCH of the SCG.

5. The processor of claim 1, wherein the RLM reference signal provided for the SCG is determined to be QCL with the PDCCH of the SCG.

6. The processor of claim 1, wherein the BFD reference signal provided for the SCG is determined to be QCL with the PDCCH of the SCG.

7. A method, comprising:
   establishing a wireless link with a cellular base station that provides a master cell group (MCG) for a wireless device;
   establishing an additional wireless link with a second cellular base station that provides a secondary cell group (SCG) for the wireless device, wherein the SCG includes a primary secondary cell (PSCell);
   receiving an indication to deactivate the SCG;
   receiving at least one of a radio link monitoring (RLM) reference signal to perform RLM or a beam failure detection (BFD) reference signal to perform BFD on the SCG while the SCG is deactivated;
   receiving an additional indication to reactivate the SCG without performing a random access channel (RACH) procedure on the SCG;
   determining quasi-co-located (QCL) information for a physical downlink control channel (PDCCH) of the SCG using the at least one of the RLM reference signal or BFD reference signal that was received while the SCG was deactivated; and
   performing PDCCH decoding for the PDCCH of the SCG based at least in part on the determined QCL information for the PDCCH of the SCG.

8. The method of claim 7, further comprising:
   receiving an other indication of a bandwidth part (BWP) on which to activate the SCG.

9. The method of claim 8, wherein the QCL information for the PDCCH of the SCG is determined based at least in part on the other indication of the BWP on which to activate the SCG.

10. The method of claim 7, further comprising:
    receiving a different indication configuring one or more RLM parameters for use for activating the SCG, wherein the one or more RLM parameters include one or more timer or parameter values associated with a radio link failure (RLF).

11. The method of claim 10, further comprising:
    receiving an additional different indication of one or more exit conditions for using the one or more RLM parameters configured for use for activating the SCG, wherein the one or more exit conditions are associated with a successful downlink communication reception on the SCG and a configured amount of time having elapsed.

12. The method of claim 7, further comprising:
determining that PDCCH decoding for the PDCCH of the SCG is unsuccessful; and
performing a RACH procedure on the SCG based at least in part on determining that PDCCH decoding for the PDCCH of the SCG is unsuccessful, wherein the RACH procedure on the SCG is performed using a cell radio network temporary identifier (C-RNTI) configured for the SCG.

13. The method of claim 12,
wherein the other indication to activate the SCG configures a dedicated RACH resource,
wherein the RACH procedure is a contention-free RACH procedure performed using the dedicated RACH resource configured by the other indication to activate the SCG.

14. The method of claim 7, further comprising:
receiving a subsequent indication from the MCG to provide channel feedback for the SCG to the MCG;
performing one or more channel measurements for the SCG; and
providing the channel feedback for the SCG to the MCG, wherein the channel feedback is determined based at least in part on the one or more channel measurements for the SCG, wherein the channel feedback for the SCG is provided to the MCG using a physical uplink shared channel (PUSCH) for the MCG.

15. A method, comprising:
by a cellular base station:
establishing a wireless link with a wireless device, wherein the cellular base station provides a master cell group (MCG) for the wireless device, wherein the wireless device has an additional wireless link established with a second cellular base station that provides a secondary cell group, SCG, for the wireless device, wherein the SCG includes a primary secondary cell, PSCell;
providing, to the wireless device, an indication to deactivate the SCG;
providing, to the wireless device, at least one of a radio link monitoring (RLM) reference signal to perform RLM or a beam failure detection (BFD) reference signal to perform BFD on the SCG while the SCG is deactivated; and
providing an additional indication to the wireless device to activate the SCG without performing a random access channel (RACH) procedure on the SCG, wherein the additional indication to activate the SCG includes a subsequent indication of quasi-co-located (QCL) information for a physical downlink control channel (PDCCH) of the SCG, and wherein the at least one of the RLM reference signal or BFD reference signal are provided to the wireless device for determination of the QCL information.

16. The method of claim 15, further comprising:
providing a different indication to the wireless device of a bandwidth part (BWP) on which to activate the SCG.

17. The method of claim 15, further comprising:
configuring a dedicated RACH resource for the wireless device for the SCG, wherein the dedicated RACH resource is configured for use if PDCCH decoding for the SCG is unsuccessful.

18. The method of claim 15, further comprising:
providing an indication to the wireless device to provide channel feedback for the SCG;
receiving the channel feedback for the SCG from the wireless device, wherein the channel feedback for the SCG is received using a physical uplink shared channel (PUSCH); and
providing the channel feedback for the SCG received from the wireless device to the SCG.

19. The method of claim 15, further comprising:
providing an other indication configuring one or more RLM parameters for use for activating the SCG, wherein the one or more RLM parameters include one or more timer or parameter values associated with a radio link failure (RLF).

20. Method of claim 15, further comprising:
providing an additional subsequent indication of one or more exit conditions for using the one or more RLM parameters configured for use for reactivating the SCG, wherein the one or more exit conditions are associated with a successful downlink communication reception on the SCG and a configured amount of time having elapsed.

* * * * *